United States Patent
Lee et al.

(10) Patent No.: US 8,724,121 B2
(45) Date of Patent: May 13, 2014

(54) MEASURING METHOD OF 3D IMAGE DEPTH AND A SYSTEM FOR MEASURING 3D IMAGE DEPTH USING BOUNDARY INHERITANCE BASED HIERARCHICAL ORTHOGONAL CODING

(75) Inventors: Sukhan Lee, Yongin-si (KR); Quang Lam Bui, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 13/530,221

(22) Filed: Jun. 22, 2012

(65) Prior Publication Data
US 2012/0327430 A1 Dec. 27, 2012

(30) Foreign Application Priority Data
Jun. 22, 2011 (KR) .......................... 10-2011-0060727

(51) Int. Cl.
*G01B 11/22* (2006.01)
(52) U.S. Cl.
USPC ............ 356/625; 356/604; 356/610; 356/618
(58) Field of Classification Search
USPC .......... 356/601–625; 382/154, 115, 106, 107, 382/241
See application file for complete search history.

(56) References Cited

U.S. PATENT DOCUMENTS

| | | | |
|---|---|---|---|
| 4,846,577 A * | 7/1989 | Grindon | 356/610 |
| 5,598,453 A * | 1/1997 | Baba et al. | 378/146 |
| 6,438,272 B1 * | 8/2002 | Huang et al. | 382/286 |
| 6,754,370 B1 * | 6/2004 | Hall-Holt et al. | 382/106 |
| 7,182,465 B2 * | 2/2007 | Fuchs et al. | 353/69 |
| 7,440,590 B1 * | 10/2008 | Hassebrook et al. | 382/108 |
| 7,545,516 B2 * | 6/2009 | Jia et al. | 356/603 |
| 8,326,020 B2 * | 12/2012 | Lee et al. | 382/154 |
| 2006/0210145 A1 * | 9/2006 | Lee et al. | 382/154 |
| 2008/0279446 A1 * | 11/2008 | Hassebrook et al. | 382/154 |
| 2009/0097039 A1 * | 4/2009 | Kawasaki et al. | 356/603 |

OTHER PUBLICATIONS

Lee et al., "Signal Separation Coding for Robust Depth Imaging Based on Structured Light", IEEE International Conference on Robotics and Automation, vol. 4, Apr. 2005, pp. 4430-4436.*

* cited by examiner

*Primary Examiner* — Sang Nguyen
(74) *Attorney, Agent, or Firm* — NSIP Law

(57) ABSTRACT

A method of decoding hierarchically orthogonal structured light and a 3-D depth measurement system using the same include a step of detecting boundary lines encoded at an identical position between layers and a boundary line inheritance step of converting the detected boundary lines into identical boundary lines. The present invention relates to a method of precisely searching for the boundary line of a pattern of radiated structured light based on the real coordinate system of an image plane, and an object thereof is to search for a boundary line irrespective of the reflection of a surface of an object, clearly classify a true boundary line and a false boundary line in a poor radiance environment, and increase the accuracy of a boundary line placed in another layer through inheritance.

17 Claims, 14 Drawing Sheets

Prior Art

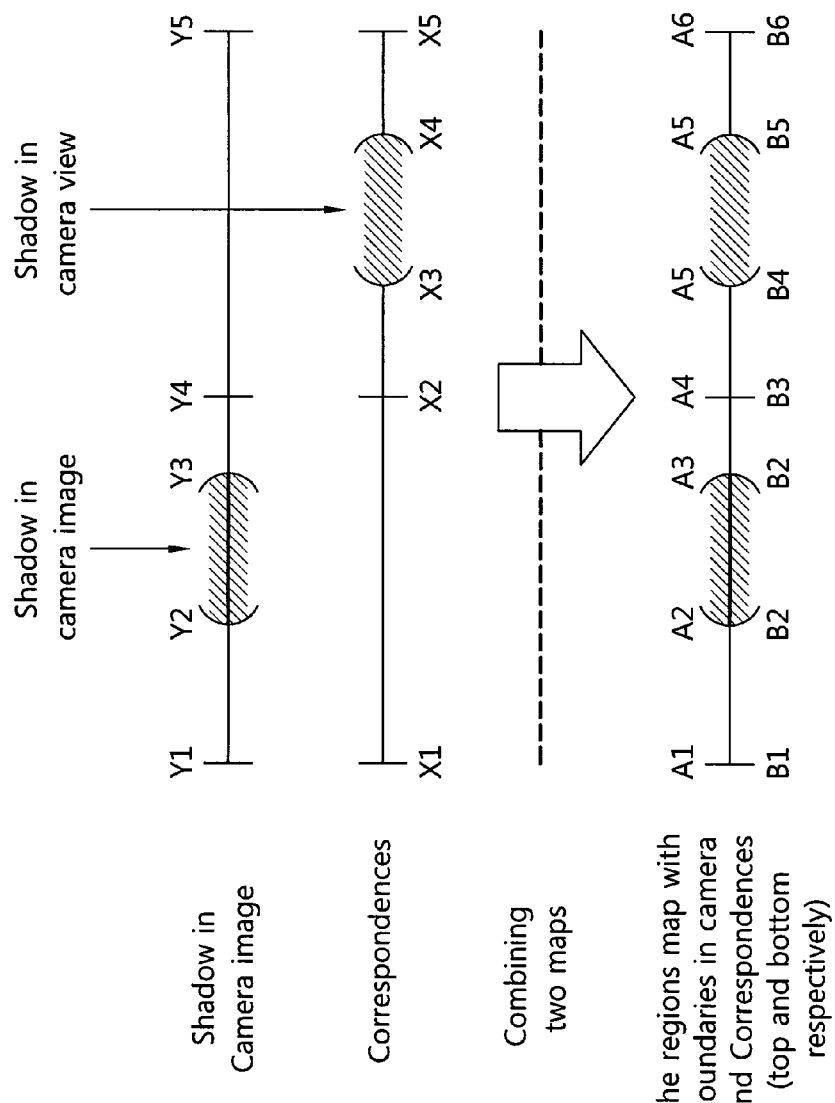

FIG. 7c

| Layer k | | | | | | | | |
|---|---|---|---|---|---|---|---|---|
| 1 | 0 | 0 | 0 |
| 0 | 1 | 0 | 0 |
| 0 | 0 | 1 | 0 |
| 0 | 0 | 0 | 1 |
| Address: 0 | 1 | 2 | 3 |

| Layer k+1 |
|---|
| 1 0 0 0 | 0 1 0 0 | 0 0 1 0 | 0 0 0 1 | 1 0 0 0 | 0 1 0 0 | 0 0 1 0 | 0 0 0 1 | 1 0 0 0 | 0 1 0 0 | 0 0 1 0 | 0 0 0 1 | 1 0 0 0 | 0 1 0 0 | 0 0 1 0 | 0 0 0 1 |
| Address: 0 1 2 3 0 1 2 3 0 1 2 3 0 1 2 3 |

MEASURING METHOD OF 3D IMAGE DEPTH AND A SYSTEM FOR MEASURING 3D IMAGE DEPTH USING BOUNDARY INHERITANCE BASED HIERARCHICAL ORTHOGONAL CODING

CLAIM FOR PRIORITY

Priority to Korean patent application 10-2011-0060727 filed on Jun. 22, 2011, the entire disclosure of which is incorporated by reference herein, is claimed.

BACKGROUND

1. Technical Field

The present invention relates to a method of decoding hierarchically orthogonal structured light and an 3-D depth measurement system using the same and, particularly, to a method of decoding hierarchically orthogonal structured light which enables precise 3-D depth measurement because a deformed signal can be precisely restored using a new scheme called signal separation coding and a 3-D depth measurement system using the same.

2. Related Art

In general, a 3-D depth measurement method using structured light is recently in the spotlight because the 3-D depth measurement method is suitable for sensing a 3-D environment in service robot engineering. A basic principle of depth measurement using structured light, that is, an active stereo scheme lies in that a ray of light is radiated to an object using a projection apparatus, such as a projector, the object to which the ray of light has been radiated is captured using an image reception apparatus, such as a camera, the depth to the object is calculated by monitoring how degree is the ray of light distorted by the object, and a depth image is obtained based on the calculated depth.

FIG. 1 is a schematic diagram for illustrating the principle of a 3-D depth measurement system based on structured light. As shown in FIG. 1, the 3-D position of one point x of the target object 100 is determined as an intersection point where a straight line, coupling the original point Op of projection means and a point p on the image plane 200 of a projection apparatus, meets a straight line that couples the original point Oc of an image reception apparatus and a point q on the image plane 300 of the image reception apparatus. Accordingly, if the projector (i.e., the projection apparatus) and the camera (i.e., the image reception apparatus) have been corrected, the depth image may be obtained by calculating the coordinates of the x point as a pair of address values in each image plane of the points p and q. That is, in this stereo scheme, the core of the method of measuring the depth image is to determine a point corresponding to a pixel in a received image and a projected image. When the corresponding point is determined, the distance may be easily calculated according to simple geometry.

For the accuracy of depth measurement, a light pattern projected from the projection apparatus is temporally coded according to spatial and/or time sequences on a pixel array so that the spatial and/or temporal addresses of a signal detected by the image reception apparatus may solely determine a point corresponding to a pixel of a corresponding projection apparatus.

As related to this application, there is Korean Patent Registration No. 10-0588296 for a 3-D image generation apparatus using orthogonally hierarchically structured light in which the pixel of each projection apparatus is addressed and projected using orthogonally hierarchically structured light and the results are decoded in an image reception apparatus.

A conventional technique for hierarchically structured light, proposed in Korean Patent Registration No. 10-0588296, is simply described using FIG. 2. FIG. 2 is an exemplary diagram showing projection light of hierarchically orthogonal light, having three hierarchical layers, that is projected on a projection region. As shown in FIG. 2(a), in a layer 1, a projection region is addressed by light projected between a point of time t0 and a point of time t3. A projection region is addressed into (1 0 0 0) and projected at the point of time t0, a projection region is addressed into (0 1 0 0) and projected at the point of time t1, a projection region is addressed into (0 0 1 0) and projected at the point of time t2, and a projection region is addressed into (0 0 0 1) and projected at the point of time t3. Likewise, as shown in FIG. 2(b), in a layer 2, each the regions of the layer 1 is addressed into a detailed region and projected. The layer 2 includes a point of time t4 to a point of time t7. A projection region is addressed into (1000 1000 1000 1000) and projected at the point of time t4, a projection region is addressed into (0100 0100 0100 0100) and projected at the point of time t5, a projection region is addressed into (0010 0010 0010 0010) and projected at the point of time t6, and a projection region is addressed into (0001 0001 0001 0001) and projected at the point of time t7. Finally, in a layer 3, as shown in FIG. 2(c), each of the regions classified in the layer 2 is addressed into a detailed region and projected, and the layer 3 includes a point of time t8 to a point of time t11. A projection region is addressed into (1000100010001000 1000100010001000 1000100010001000 1000100010001000) and projected at the point of time t8, a projection region is addressed into (0100010001000100 0100010001000100 0100010001000100 0100010001000100) and projected at the point of time t9, a projection region is addressed into (0010001000100010 0010001000100010 0010001000100010 0010001000100010) at the point of time t10, and a projection region is addressed into (0001000100010001 0001000100010001 0001000100010001 0001000100010001) and projected at the point of time t11.

As shown in FIG. 2, when an image is projected on the projection apparatus, the image reception apparatus may check information about the depth of a 3-D image by decoding the address of the projection apparatus corresponding to each pixel. A system using hierarchically structured light as in FIG. 2 is problematic in that a boundary line becomes unclear in an image signal received by the image reception apparatus depending on a geometric shape of a target object placed in a relevant boundary region, the degree that light is reflected, external environments, etc. in classifying regions according to precise timing in the image reception apparatus and projecting light. However, a conventional technique had many problems because an image is classified according to specific timing when decoding addresses included in a received image and the addresses included in the received image are restored despite of the above problem.

SUMMARY

An object of the present invention is to provide a method of decoding hierarchically orthogonal structured light using hierarchically structured light and a 3-D depth measurement system using the same, which can reduce decoding errors by clarifying the boundary region of a lower layer in checking a 3-D depth using hierarchically structured light.

The present invention relates to a method of precisely searching for the boundary line of a pattern of radiated structured light based on the real coordinate system of an image plane, and an object thereof is to search for a boundary line irrespective of the reflection of a surface of an object, clearly classify a true boundary line and a false boundary line in a poor radiance environment, and increase the accuracy of a boundary line placed in another layer through inheritance. The object of the present invention relates to a method of decoding hierarchically orthogonal structured light, the method obtaining a 3-D image by encoding the structured light including hierarchically orthogonal address information, radiating the encoded light to a target object, and decoding relevant address from a camera image obtained by capturing the target object to which the encoded light is radiated, and it may be achieved by a step of detecting boundary lines encoded at an identical position between layers and a boundary line inheritance step of converting the boundary lines, detected in the step of detecting boundary lines encoded at an identical position between layers, into identical boundary lines.

The step of detecting boundary lines encoded at an identical position between layers may include a step of correcting the boundary lines by taking different reflectivities of surfaces of the target object into consideration in order to precisely measure positions of the boundary lines.

The step of correcting the boundary lines by taking different reflectivities of surfaces of the target object into consideration may use $$f_c(x) = ((s(x) \otimes g_p(x, \sigma_p))R(x) + A(x)) \otimes g_c(x, \sigma_c) + W(x)$$

$$f_c(x) \approx \frac{deconvlucy((f_c(x) - f_0(x)), \sigma_c)}{deconvlucy((f_1(x) - f_0(x)), \sigma_c)} (H - L).$$

(wherein fs(x) is a captured light stripe signal in a camera image, s(x) is a pattern for projector illumination, R(x) is a reflection index of the local surface at x, fc(x) is a canonical form of light pattern, A(x) is ambient light, gp(x,σp) is a Gaussian blur kernel of a projector lens at x position with blur radius σp, gc(x,σc) is Gaussian blur kernel of camera lens at x position with blur radius ac, W(x) is noise of an imaging sensor, fo(x) is a captured image when black pattern is projected, f1($x$) is a captured image when white pattern is projected, H is a maximum intensity of pattern image (here we used 255), and L is the minimum intensity of pattern image (here we used 0))

The boundary line inheritance step of converting the detected boundary lines into identical boundary lines may include a first step of obtaining a detected boundary point d from which an image is checked in a current layer, a second step of obtaining a time-series boundary point D detected in time series, a third step of calculating a difference value d−D between the time-series boundary point D and the detected boundary point d, and a fourth step of changing the detected boundary point d into an identical boundary with the time-series boundary point D if the difference value calculated in the third step falls within a range Δd and setting the detected boundary point d as a new boundary point if the difference value calculated in the third step does not fall within the range Δd. Here, the first step and the second step are performed irrespective of order.

The boundary line inheritance step of converting the detected boundary lines into identical boundary lines may include a first step of obtaining an upper layer boundary point D detected in an upper layer, a second step of obtaining a detected boundary point d from which an image is checked in a current layer, a third step of calculating a difference value d−D between the detected boundary point d and the upper layer boundary point D, and a fourth step of changing the detected boundary point d into an identical boundary with the upper layer boundary point D if the difference value calculated in the third step falls within a range Δd and setting the detected boundary point d as a new boundary point if the difference value calculated in the third step does not fall within the range Δd.

The boundary line inheritance step of converting the detected boundary lines into identical boundary lines may include setting a region between d and D in the current layer so that the region between d and D in the current layer may be included in a region next to a time-series boundary point D of the upper layer or the upper layer boundary point D, if the difference value d−D calculated in the third step has a value smaller than zero.

The boundary line inheritance step of converting the detected boundary lines into identical boundary lines may include setting a region between d and D in the current layer so that the region between d and D in the current layer may be included in a region anterior to a time-series boundary point D of the upper layer or the upper layer boundary point D, if the difference value d−D calculated in the third step has a value greater than zero.

Another object of the present invention relates to a 3-D depth measurement system, including a projection apparatus for encoding structured light including hierarchically orthogonal addresses and radiating the encoded structured light to a target object, an image reception apparatus for receiving light radiated to the target object, and an operation processing apparatus for decoding an address of the structured light, corresponding to each pixel of the image reception apparatus, from an image received from the image reception apparatus and calculating and processing a 3-D depth of the target object, wherein the operation processing apparatus detects boundary lines encoded at an identical position between layers and performs a boundary line inheritance process of converting the detected boundary lines into identical boundary lines. The boundary inheritance process may include obtaining a detected boundary point d from which an image is checked in a current layer, obtaining a time-series boundary point D detected in time series, calculating a difference value d−D between the time-series boundary point D and the detected boundary point d, and changing the detected boundary point d into an identical boundary with the time-series boundary point D if the difference value falls within a range Δd and setting the detected boundary point d as a new boundary point if the difference value does not fall within the range Δd. The boundary inheritance process may include obtaining an upper layer boundary point D detected in an upper layer, a second step of obtaining a detected boundary point d from which an image is checked in a current layer, a third step of calculating a difference value d−D between the detected boundary point d and the upper layer boundary point D, and a fourth step of changing the detected boundary point d into an identical boundary with the upper layer boundary point D if the difference value calculated in the third step falls within a range Δd and setting the detected boundary point d as a new boundary point if the difference value calculated in the third step does not fall within the range Δd.

In the method of decoding hierarchically orthogonal structured light and the 3-D depth measurement system using the same according to the present invention, in calculating the address of hierarchical light provided by the projection means, a substantial boundary region is calculated, compared with a boundary point checked in time-series, and then made identical with a boundary point placed in an upper layer if a difference between the substantial boundary region and the boundary point falls within a specific range. Accordingly, 3-D depth image generation errors can be reduced.

The present invention relates to a method of precisely searching for the boundary line of a pattern of radiated structured light based on the real coordinate system of an image plane and can search for a boundary line irrespective of the reflection of a surface of an object, clearly classify a true boundary line and a false boundary line in a poor radiance environment, and increase the accuracy of a boundary line placed in another layer through inheritance.

BRIEF DESCRIPTION OF DRAWINGS

FIG. 7b is region defining procedure in one layer, each color represents for one region.

FIG. 7c shows the HOC and the corresponding addresses.

DESCRIPTION OF EXAMPLE EMBODIMENTS OF THE PRESENT INVENTION

Figure 1:
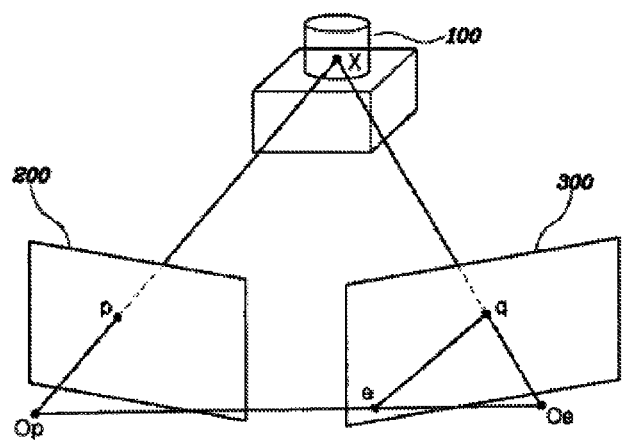
FIG. 1 is a schematic diagram for illustrating the principle of a 3-D depth measurement system based on structured light.

The present invention may be modified in various ways, and the present invention may have several embodiments. Specific embodiments of the present invention are illustrated in the drawings and described in detail.

However, the present invention is not limited to the specific embodiments, but should be interpreted as including all changes, equivalents, and substitutions included in the spirit and technical range of the present invention.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may also be named a first element. The term 'and/or' includes a combination of a plurality of related and described items or any one of a plurality of related and described items.

If one element is described to be "connected" or "coupled" to the other element, the one element may be directly connected or coupled to the other element, but it should be understood that a third element may exist between the two elements. In contrast, if one element is described to be "directly connected" or "directly coupled" to the other element, it should be understood that a third element does not exist between the two elements.

The terms used in this application are used to only describe the specific embodiments and are not intended to restrict the present invention. An expression of the singular number includes an expression of the plural number unless clearly defined otherwise in the context. In this application, terms, such as "comprise" or 'have", are intended to designate that characteristics, numbers, steps, operations, elements, or parts which are described in the specification, or a combination of them exist, and should be understood that they exclude the existence or possible addition of one or more other characteristics, numbers, steps, operations, elements, parts, or combinations of them in advance.

All the terms used herein, unless otherwise defined, have the same meanings which are typically understood by those having ordinary skill in the art. The terms, such as ones defined in common dictionaries, should be interpreted to have the same meanings as terms in the context of pertinent technology, and should not be interpreted to have ideal or excessively formal meanings unless clearly defined in the specification.

Hereinafter, preferred embodiments of the present invention will be described in detail with reference to the accompanying drawings. In describing the present invention, in order to help overall understanding, the same reference numerals designate the same elements throughout the drawings, and a redundant description of the same elements is omitted.

Figure 3:
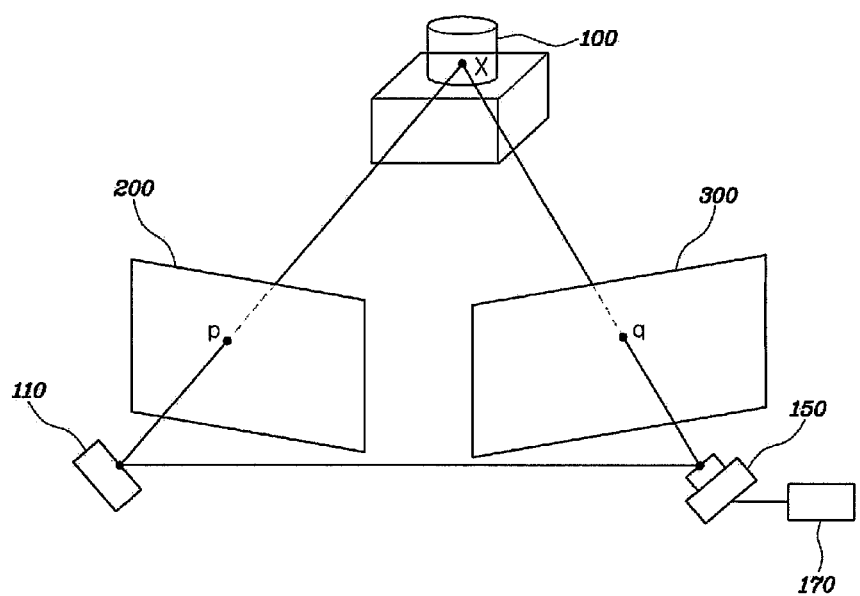
FIG. 3 shows the structure of a 3-D depth measurement system using region-based address allocation hierarchically structured light according to the present invention.

FIG. 3 shows the structure of a 3-D depth measurement system using region-based address allocation hierarchical structural light according to he present invention. The 3-D depth measurement system according to the present invention includes a projection apparatus 110 for encoding structured light including hierarchically orthogonal addresses and radiating the encoded structured light to a target object, an image reception apparatus 150 for receiving the light radiated to the target object, and an operation processing apparatus 170 for decoding an address of the structured light corresponding to each of the pixels of the image reception apparatus 150 from an image received from the image reception apparatus 150 and calculating and processing a 3-D depth of the target object 100. The 3-D depth measurement system of the present invention, including the projection apparatus 110, the image reception apparatus 150, and the operation processing apparatus 170, may be applied to a 3-D measurement system, a quality test system, a robot system, etc.

2. A. Structured Light Pattern

Figure 2:
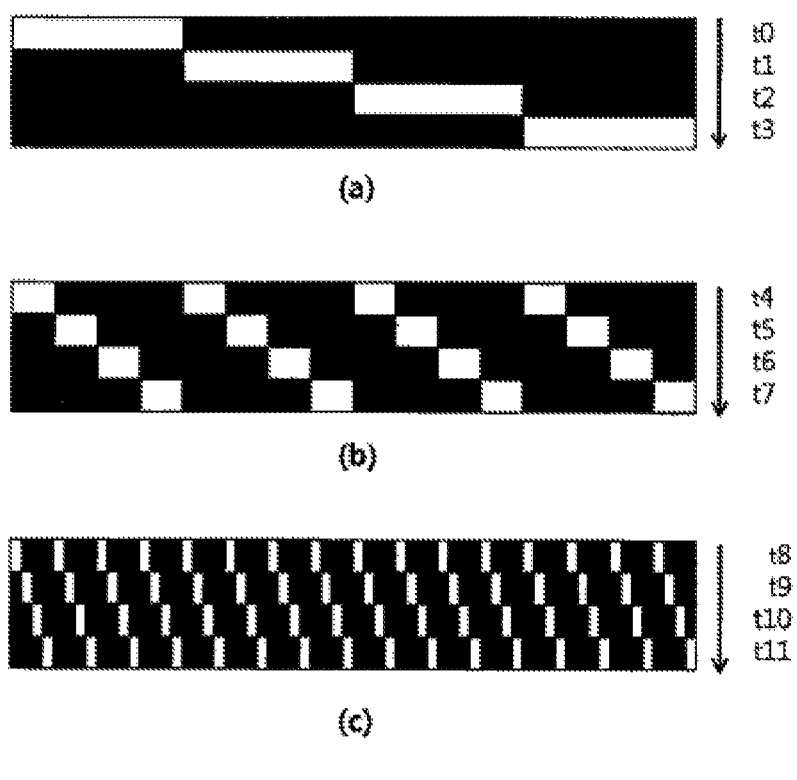
FIG. 2 is an exemplary diagram showing projection light of hierarchically orthogonal light, having three hierarchical layers, that is projected on a projection region.

In previous work [paper A] (S. Lee, J. Choi, D. Kim et al., "Signal Separation Coding for Robust Depth Imaging Based on Structured Light.", Proceedings of the IEEE International Conference on Robotics and Automation, 2005, pp. 4430-4436.), we developed a structured light pattern named as "Hierarchical Orthogonal Coding (HOC)", in which the orthogonal codes are arranged hierarchically in order to reduce the length of codes. The length f of code signals divided into a few layers L and each layer includes H orthogonal codes recursively as shown in FIG. 2. Although the signal codes in the HOC are not orthogonal, each layer has a set of orthogonal codes. For more details, please refer [paper A].

For example, we assume that a HOC has four layers (L=4) and the number of orthogonal codes in each layer is also four (H1=H2=H3=H4=4). In this case, the total number of signal codes is 256 (H1×H2×H3×H4=256) and the code length is 16 (H1+H2+H3+H4=16), i.e. we need 16 frames of camera image for decoding addresses of the signals.

Figure 4A:
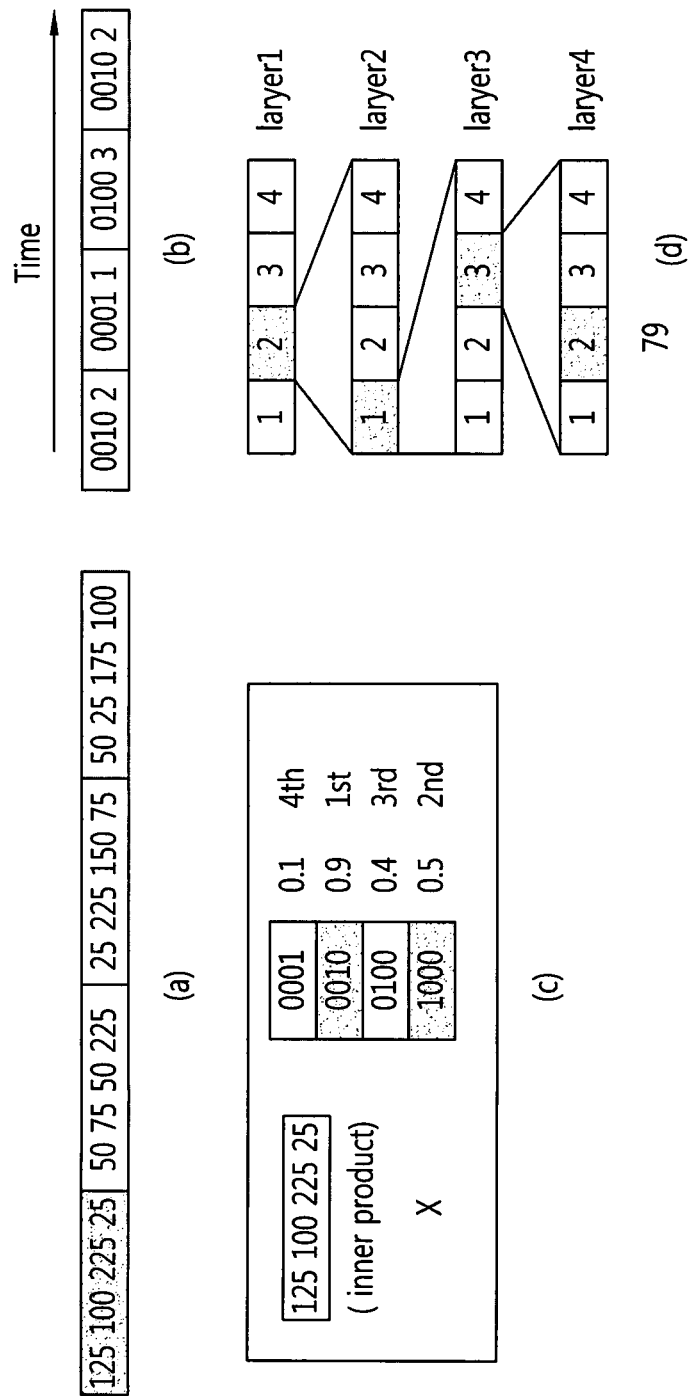
FIG. 4a is a conceptual description of an HOC based signal decoding process which is including (a) a signal of pixel values at i-th position, (b) signal separating by multiplying an orthogonal matrix, (c) selecting a set of probable codes, and (d) decoding of the correct address.

The decoding process of HOC patterns is as follows (as illustrated in FIG. 4a). FIG. 4a is a conceptual description of an HOC based signal decoding process which is including (a) a signal of pixel values at i-th position, (b) signal separating by multiplying an orthogonal matrix, (c) selecting a set of probable codes, and (d) decoding of the correct address. At the i-th pixel position, in each layer we have a set of pixel intensity $yi=(I1; I2; I3; I4)^T$ from four patterns. The signals are separated by multiplying yi with an orthogonal matrix: $c_i=Xy_i$, then selecting a probable code for $c_i$. Repeating for all layers, we have a set of probable codes, and then decode the correct address.

However, this decoding method is sensitive to variation of surface reflectance, especially at the boundaries of the patterns; and not accurate enough in depth measurement since the true boundaries of the light stripes cannot be located. In following sections, we describe a new decoding method for HOC patterns which is robust to variation of surface reflectance (by a top-down approach with region based correspondence) and accurate in depth measurement (by accurately estimate the stripe boundaries).

2. B.1. Accurate Stripe Boundary Estimation

Stripe Boundary Estimation

Accurately estimating the stripe boundary is crucial issue in improving depth measurement of structured light 3D camera systems. Since the projector correspondence is computed regarding the boundaries of light stripes on the camera images.

Here we adopt the result of a previous work on designing an accurate boundary estimator [paper B](S. Lee, L. Q. Bui, "Accurate estimation of the boundaries of a structured light pattern," J. Opt. Soc. Am. A, vol. 28, no. 6, 2011, pp. 954-961). The captured light stripe signal in camera image, $f_s(x)$, can be modeled as follows:

$$f_s(x)=((s(x) \otimes y_p(x,\sigma_p))R(x)+A(x)) \otimes y_c(x,\sigma_c)+W(x) \quad (1)$$

wherein fs(x) is a captured light stripe signal in camera image, fc(x) is a canonical form of light pattern, A(x) is an ambient light, $g_p(x,\sigma_p)$ is Gaussian blur kernel of projector lens at x position with blur radius $\sigma_p$, $g_c(x,\sigma_c)$ is Gaussian blur kernel of camera lens at x position with blur radius $\sigma_c$.

s(x) is the pattern for projector illumination, which is a step function:

$$s(x) = \begin{cases} H & x \geq 0 \\ L & x < 0 \end{cases},$$

symbol $\otimes$ represents a convolution operator. In Eq. (1), the two blurring processes associated with the projector and camera lenses are modeled as a convolution with the respective blur kernels, $g_p(x,\sigma_p)$ and $g_c(x,\sigma_c)$. The blur kernels, $g_p(x,\sigma_p)$ and $g_c(x,\sigma_c)$, are chosen to be a normalized Gaussian function with $g_p(x,\sigma_p)$ and $g_c(x,\sigma_c)$ representing their respective (center, variance) pairs:

$$g_p(x, \sigma_1) = \frac{1}{\sigma_1\sqrt{2\pi}} e^{\left(\frac{x^2}{2\sigma_1^2}\right)},$$

where i is p or c. R(x) is the reflection index of the local surface at x,) R(x)∈[0,1] is the ambient light, and W(x) is the noise of the imaging sensor.

Also the light patterns captured on the image in correspondence to the respective all-bright and all-dark pattern projections [i.e., $s_1(x)=H$ and $s_0(x)=L$]:

$$f_1(x)=(H*R(x)+A(x)) \otimes g_c(x,\sigma_c)+W_1(x)$$

$$f_0(x)=(L*R(x)+A(x)) \otimes g_c(x,\sigma_c)+W_0(x)$$

Then the amount of light from the projector hitting the local surface corresponding to x is estimated as:

$$f_c(x) \approx \frac{deconvlucy((f_c(x)-f_0(x)), \sigma_c)}{deconvlucy((f_1(x)-f_0(x)), \sigma_c)}(H-L) \quad (2)$$

where "deconvlucy" represents the Richardson-Lucy deconvolution operator [paper c] (W. H. Richardson, "Bayesian-Based Iterative Method of Image Restoration," J. Opt. Soc. Am. A, vol. 62, 1972, pp. 55-59.) and [paper d] (L. B. Lucy, "An iterative technique for the recti_cation of observed distributions," As-tronomical Journal, vol. 79, 1974, pp. 745-754.) that we chose to use for the computation of de-convolution. $f_o(x)$ is the captured image when black pattern is projected, $f_1(x)$ is the captured image when white pattern is projected, H is the maximum intensity of pattern image (for example, here we used 255), L is the minimum intensity of pattern image (for example, here we used 0), $\sigma_c$ is blur radius.

The canonical form of light pattern, $f_c(x)$, computed by Eq. (2) is regarded as correcting the edges of $f_s(x)$ corrupted by R(x), as well as by A(x) and $g_c(x,\sigma_c)$, thus providing a mean of recovering the true boundary embedded in s(x). We estimate the boundaries of a light pattern by intersecting the canonical form of a light pattern with that of its inverse pattern.

For details, please refer [paper B].

In each layer of HOC patterns, the light stripe in this pattern shares a common boundary with the light stripe in next pattern. Thus two consecutive patterns in the same layer can be treated as a pattern and its inverse pattern, and then the proposed boundary estimation method is applied to find the accurate stripe boundaries. In our experiments, we use 16 HOC patterns and two additional black and white patterns.

Disambiguating Between True and False Boundaries

The stripe boundary estimation method described above can generate wrong boundaries in the low reflectance areas or near the shadows. Here we propose two criteria for boundaries selection: a detected boundary is true if:

1. The normalized edge at the position to find boundary must be in form of falling edge or rising edge, and 2. The difference between the falling and rising edge (not at the intersection) must be greater than noise level at that position.

A boundary does not meet these requirements will be classified as noise and rejected.

In the criterion 1, the normalized edge, fs(x), is the stripe signal normalized by all-bright and all-dark signals:

$$\overline{f_s}(x) = \frac{f_s(x) - f_0(x)}{f_1(x) - f_0(x)}$$

to eliminate the dependence of the captured signal on object's surface reflectance properties.

Figure 4B:
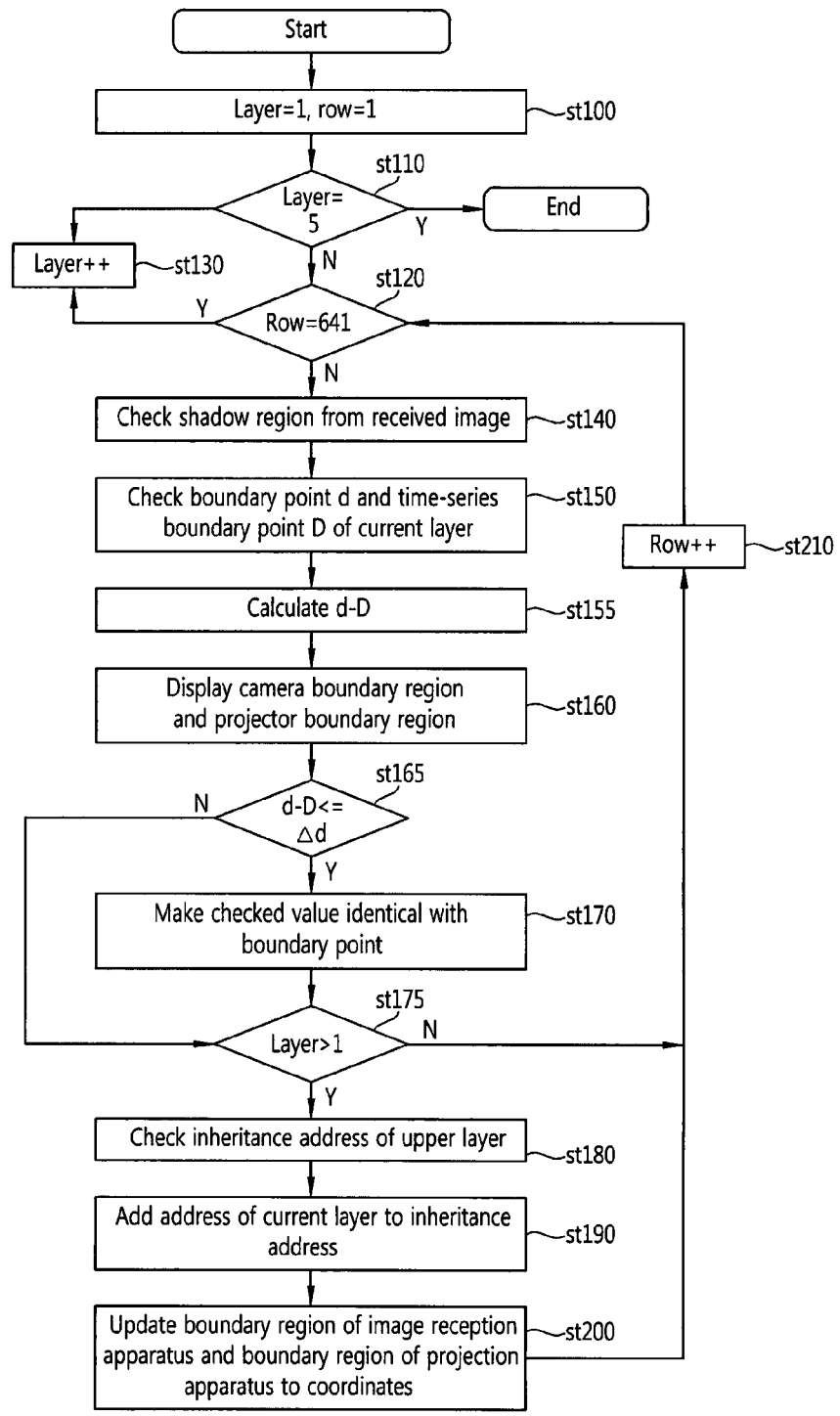
FIG. 4b is a flowchart illustrating a flow of decoding hierarchically structured light according to the present invention.

FIG. 4b is a flowchart illustrating a flow of decoding hierarchical structural light according to the present invention. It is assumed that the projection apparatus projects HOC (HIERARCHICAL ORTHOGONAL CODING) structured light of 8 bits having 16 patterns including four layers, and the image reception apparatus has 640*480 pixels. In the present invention, however, the HOC for encoding addresses into projected light and decoding relevant addresses from light received by the image reception apparatus 150 has been described in the above-described Korean Patent Registration No. 10-0588296 and is not a major characteristic of the present invention, and thus a description thereof is omitted.

First, an initial value is assigned to a parameter (low) for calculating a row and a parameter (layer) for calculating a layer (st100). If a received image is not the final layer (st110) or a row is not the final row (st120), a boundary line setting step performed at steps st140 to st200 is performed.

The boundary of a shadow region on the image reception apparatus and the boundary of a shadow region on the projection apparatus are checked from the received image (st140), the boundary point d and time-series boundary point D of a current layer detected by the image reception apparatus are checked (st150), a value d−D is calculated (st155), and a boundary point checked at steps st140 and st150 is displayed (st160). If the value checked at step st155 is a value Δd or lower, the checked value is made identical with the boundary point checked by the image reception apparatus according to the time-series checked boundary point (st165 and st170).

If the received image is not the first layer (st175), the inheritance address of an upper layer is checked in order to calculated the address of the projection apparatus (st180), the address of the current layer is added to the checked inheritance address of the upper layer (st190), the address of the current layer is updated, and the address of the projection apparatus corresponding to the address of the image received by the image reception apparatus is stored (st200), so that the boundary line setting step is completed.

After steps st140 to st200 are performed, the row parameter (row) is increased by '1' (st210), and steps st140 to st200 are repeatedly performed on the next row of the received image until the last row. When the boundary line setting step for one layer is completed, the layer parameter (layer) is increased by '1' (st130) and then the boundary point setting step is sequentially performed on all the rows of a next layer. When the boundary line setting step for all the rows of the final layer is completed, the process is finished.

1. Image Reception Apparatus-Side Shadow Region

Figure 5:
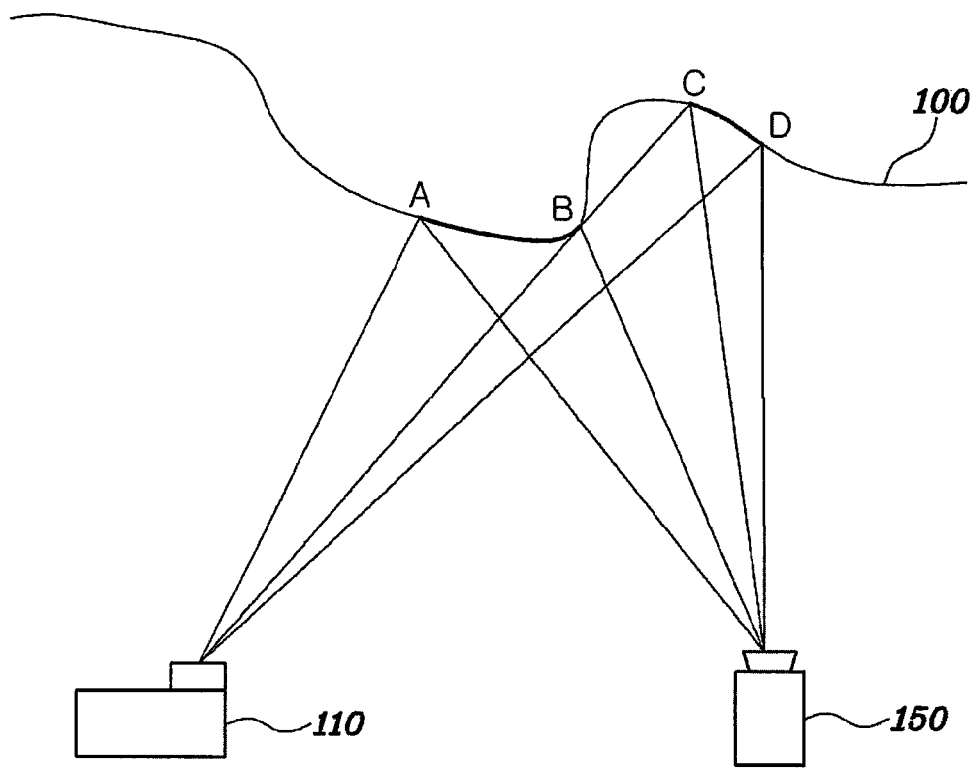
FIG. 5 is an explanatory diagram for illustrating a shadow region on the image reception apparatus side.

Assuming that a surface of the target object 100 on which light projected from the projection apparatus 110 is radiated has a curve shape shown in FIG. 5, the light radiated from the projection apparatus 110 does not reach regions B~C from among the surface regions of the target object 100. Accordingly, although any pattern is applied from the projection apparatus 110, it is checked as a shadow region because always the same illumination intensity is allocated to the regions B~C in the image reception apparatus 150. Regions, such as the regions B~C region, are defined as image reception apparatus-side shadow regions. The image reception apparatus may easily check the image reception apparatus-side shadow regions by checking regions that always the same illumination intensity is received although the pattern of light radiated from the projection apparatus 110 is changed.

This is shown on coordinates. The projection apparatus 110 detects the curve surfaces A~D of the target object as consecutive regions X1~X2 as in coordinate shown on the lower side, but the curve surfaces A~D are classified into regions Y1, Y2, Y3, and Y4 as in coordinates shown on the lower side and displayed on the image reception apparatus 150 side.

2. Projection Apparatus-Side Shadow Region

Figure 6:
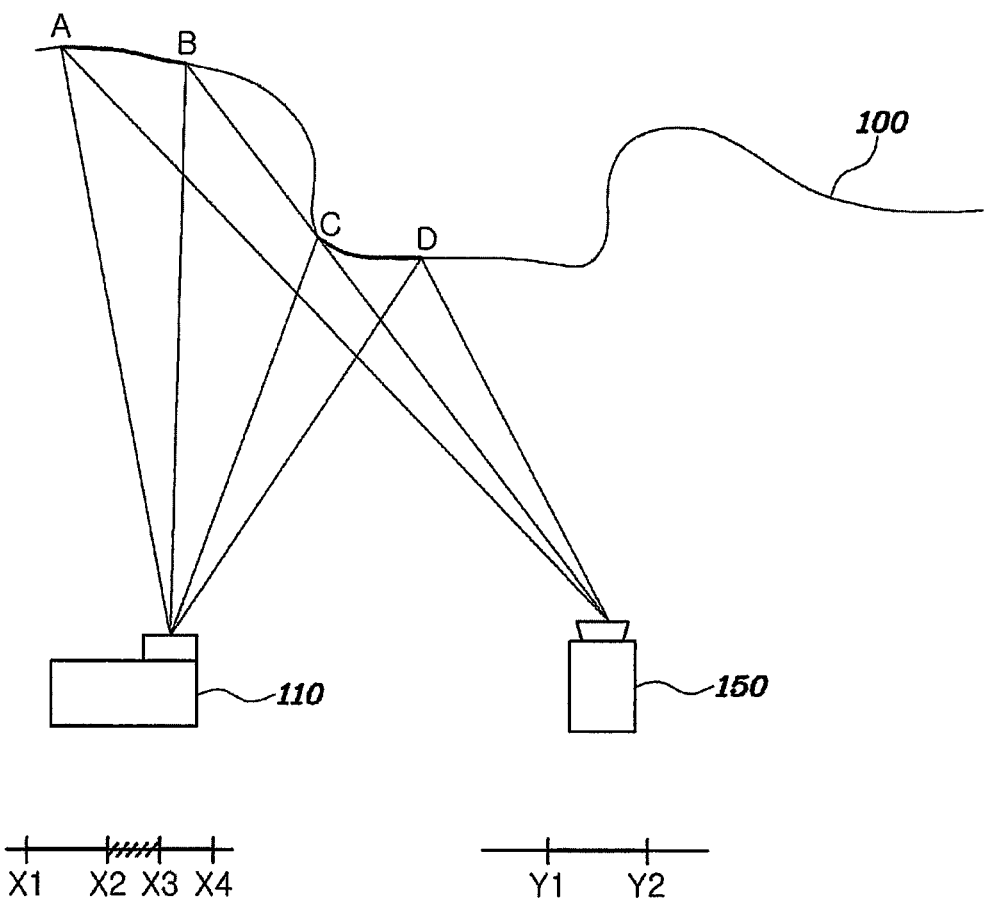
FIG. 6 is an explanatory diagram for illustrating a shadow region on the projection apparatus side.

Assuming that a surface of the target object 100 to which light projected from the projection apparatus 110 is radiated has a curve shape shown in FIG. 6, the light radiated from the projection apparatus 110 may be radiated on the entire region of the surface of the target object 100, but the image reception apparatus 150 cannot receive light radiated to regions B~C. That is, the image reception apparatus 150 detects the point B and the point C of the target object 100 as the same region, but there is an unexpected change in the pattern in a relevant point. Regions, such as the regions B~C on FIG. 6, are defined as projection apparatus-side shadow regions. The image reception apparatus 150 can easily check the projection apparatus-side shadow regions by checking a region where irregularity of an unexpected pattern occurs.

This is shown on coordinates. The projection apparatus 110 detects the curve surface regions A~D of the target object as classified regions X1, X2, X3, and X4 as in coordinates shown on the lower side, but the curve surface regions A~D are displayed a consecutive regions Y1~Y4 as in coordinates shown on the lower side on the image reception apparatus 150 side.

2. C. Boundary Inheritance

Figure 7A:
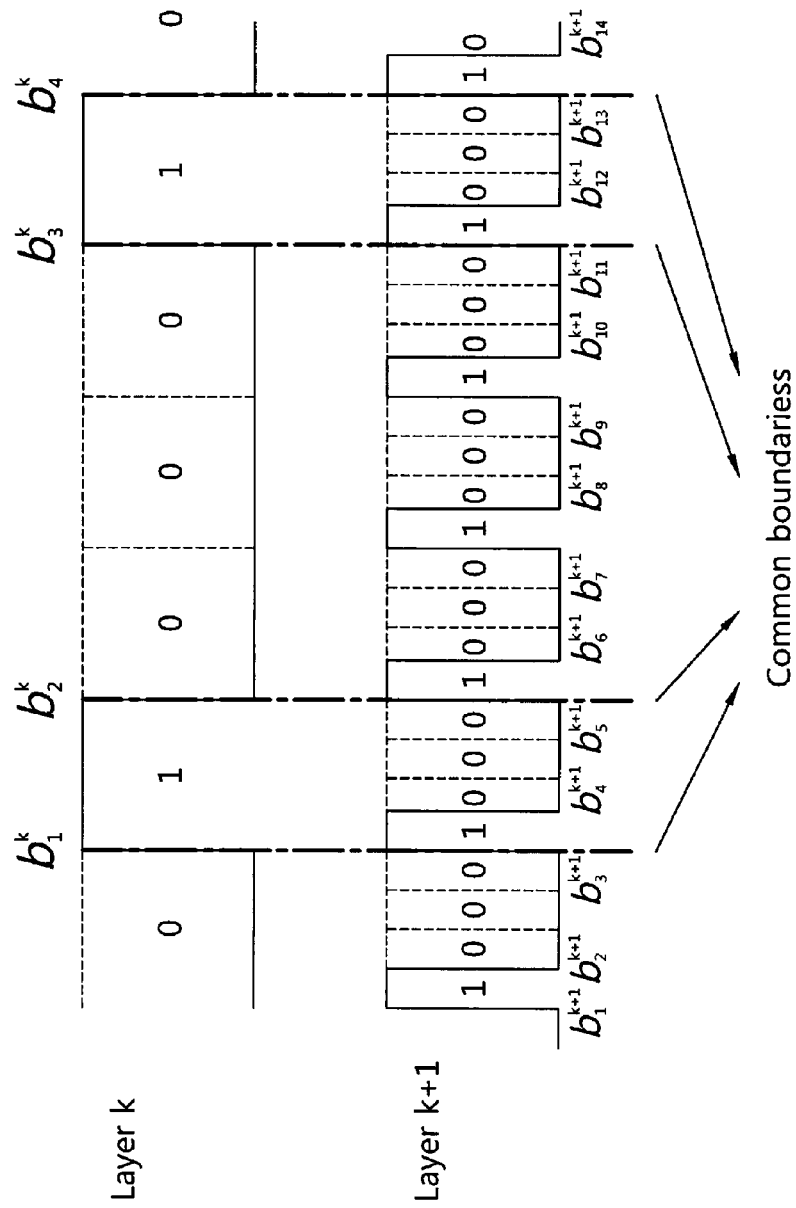
FIG. 7a is a signal of HOC pattern and its boundaries in layer k and k+1.

The boundaries in different layers of HOC have relationships in hierarchy. Each boundary in layer k is a common boundary with lower layer k+1. Moreover, the light stripes in upper layer are four times larger than in lower layer that means the boundaries in upper layer are better estimated and more robust than in lower layer. Thus the common boundaries in lower layer are inherited from the upper layer to be more accurate and robust. FIG. 7a is a signal of HOC pattern and its boundaries in layer k and k+1. The common boundaries in upper layer are inherited to lower layer. As illustrated in FIG. 7a, boundary $b_3^{k-1}$ in layer k+1 is inherited from boundary $b_1^k$ in upper layer k, $b_5^{k+1}$ is inherited from $b_2^k$, ... and so on.

The boundary inheritance not only makes Ray-Tracing codec more accurate and robust, but also helps to detect and eliminate the false boundaries, thus reduces the number of outliers, by checking the common boundaries in different layers: if one boundary in layer k is not a common boundary with lower layer k+1 then it is false boundary, and it will be eliminated.

2. D. Correspondences Inheritance

2. D.1. Defining Regions

After detecting all boundaries as described in Section 2.B, we define regions in each layer, each region is formed by two consecutive boundaries, as illustrated in FIG. 7b. FIG. 7b is region defining procedure in one layer, each color represents for one region. There are two maps we need to consider: the map of boundaries in camera image and the map of boundaries in projector image.

From captured pattern images, in each layer we can detect all the boundaries including stripe boundaries Y1, Y4, and Y5 and shadow boundaries Y2, Y3. All of these boundaries are put in a map. Also from the captured pattern images, in each layer we can compute the correspondence for each pixel [paper A]. Along each row of the image, we search for positions, named boundaries, where the pixel correspondence value changes; we get the boundary of stripes X1, X2, and X5 and the boundaries of shadow X3 and X4 in projector image. Because X1, X2, and X5 are the boundaries of black and white fringes in projector image, then corresponding positions in camera image will be Y1, Y4, and Y5, respectively.

Combining these two boundary maps we get a region map where two consecutive boundaries enclose a region, as shown in FIG. 5. Where A1=Y1, A4=Y4, A6=Y5; and B1=X1, B3=X2, and B6=X5. For the region of shadow [Y2,Y3] in camera image, the corresponding region in the projector image is just only one pixel, so A2 and A3 have the same correspondence value B2. The same way for the region of shadow [X3,X4] in projector image, the corresponding region in camera image is only one pixel, so B4, B5 have the same correspondence value A5.

2. D.2. Decoding by Region Correspondence Inheritance

Figure 7D:
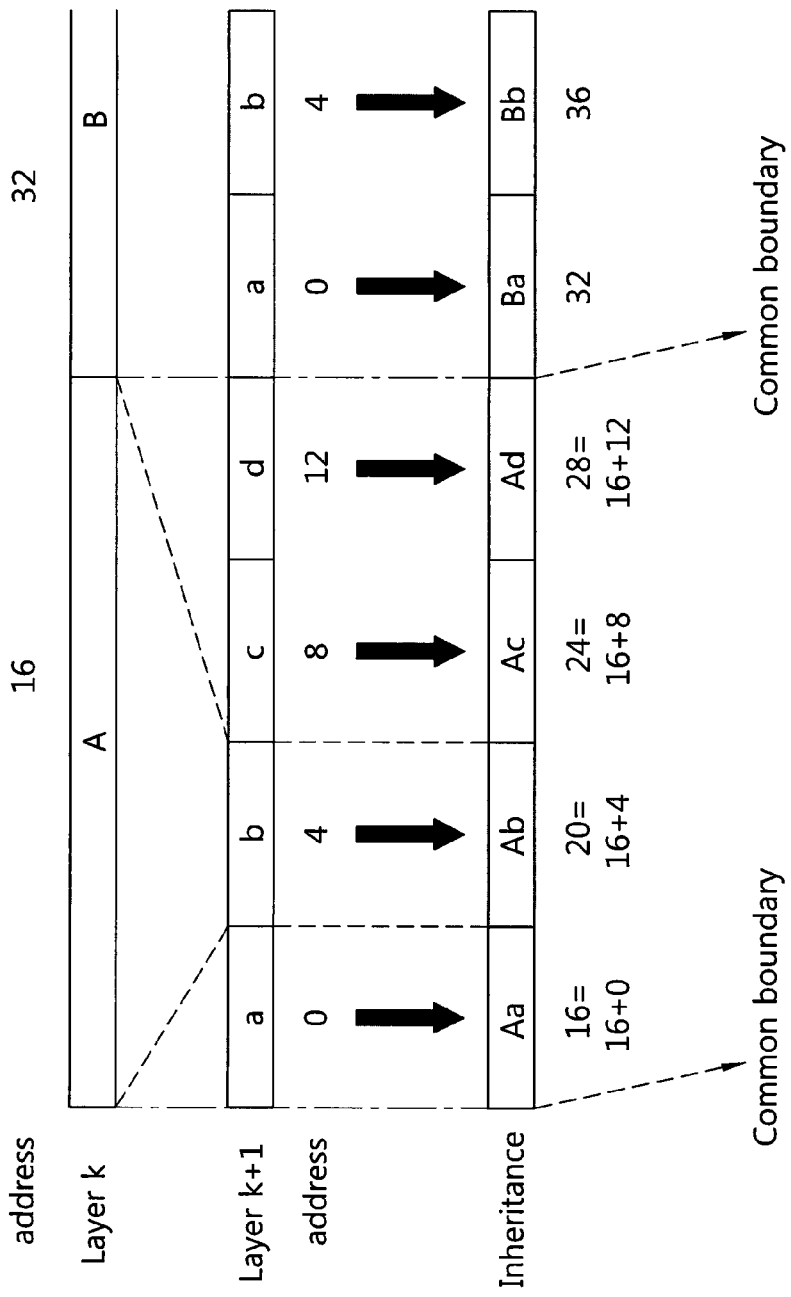
FIG. 7d shows the inheritance principle: Each sub-region in the lower layer inherits the global correspondence in upper layer to update its correspondence.

According to the design of HOC, each layer has regions with local correspondences. Each of these regions is divided into four sub-regions in next layer, as illustrated in FIG. 7c. FIG. 7c shows the HOC and the corresponding addresses. The idea of decoding correspondence is to use region-wise correspondence instead of pixel-wise correspondence. The correspondence of each region in layer k+1 is to inherit the correspondence from the containing region in upper layer k. The inheritance is described in FIG. 7d. FIG. 7d shows the inheritance principle: Each sub-region in the lower layer inherits the global correspondence in upper layer to update its correspondence.

For example: region b in layer k+1, with address 4, is inside region A, with address 16, in upper layer k, thus the correspondence of inherited region Ab is 16+4=20. This procedure is repeated from the first to the last layer, the correspondence of the regions in the last layer will be the output of the structured light pattern decoding process.

3. Generation of Merged Coordinates

Figure 7E:
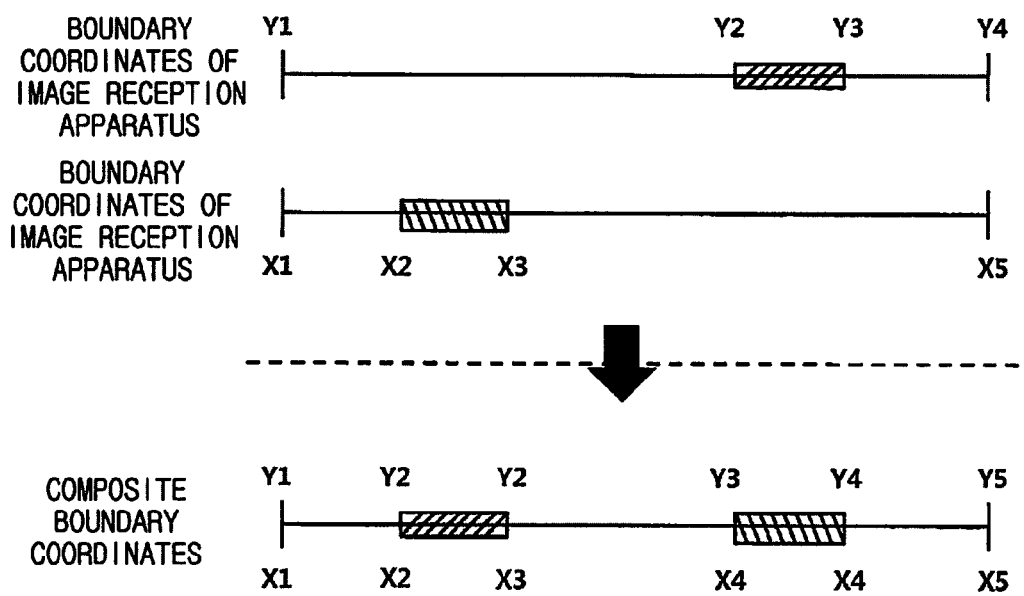
FIG. 7e is an explanatory diagram showing an example in which composite boundary coordinates are written.

When the image reception apparatus-side shadow regions and the projection apparatus-side shadow regions are checked, they are displayed on one region coordinate. FIG. 7e is an explanatory diagram showing an example in which composite boundary coordinates are written. First, boundary points in the image reception apparatus are displayed, and here the image reception apparatus-side shadow regions are also displayed. Next the boundary points in the projection apparatus are displayed, and here the projection apparatus-side shadow regions are also displayed. FIG. 7e shows that the shadow region exists between the regions Y2~Y3 in the image reception apparatus and the shadow region exists between the regions X2~X3 in the projection apparatus. They are integrated into merged coordinates and displayed. The boundary coordinates of the image reception apparatus are displayed on the upper side of the merged coordinates, and the boundary coordinates of the projection apparatus are displayed on the lower side of the merged coordinates. In the image reception apparatus-side shadow regions, it can be seen that the boundary coordinates of the image reception apparatus displayed on the upper side are Y3 and Y4 and displayed as boundaries, whereas the boundary coordinates of the projection apparatus displayed on the lower side are X4 and displayed as the same boundary. Likewise, in the projection apparatus-side shadow regions, the boundary coordinates of the image reception apparatus displayed on the upper side are displayed as Y2 where there is no boundary classification, whereas the boundary coordinates of the projection apparatus displayed on the lower side are X2 and X3, that is, classified boundaries.

4. Generation of Inheritance Coordinates

Figure 8:
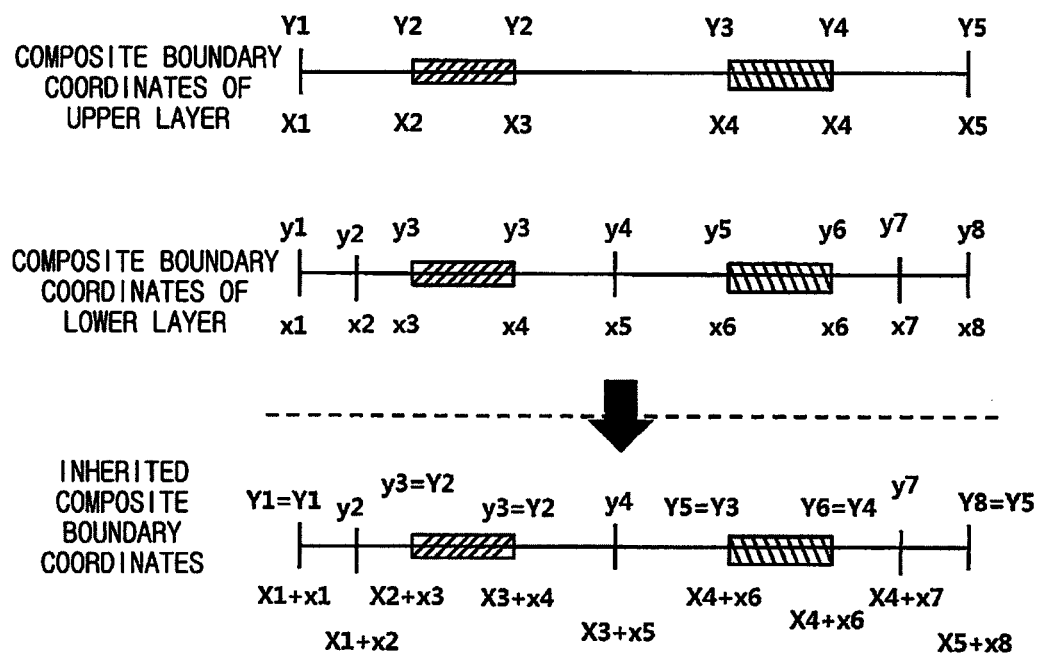
FIG. 8 is an explanatory diagram showing an example in which inherited composite boundary coordinates are written.

In the present invention, a target HOC algorithm is an algorithm that classifies one region of an upper layer into several regions in a lower layer and applies addresses to the regions. As shown in FIG. 8, regions y2, y4, y7, and y8 in a lower layer are newly added to regions where image reception apparatus have addresses Y1~Y5 in an upper layer, classified into detailed regions, thus having regions y1~y8. This is viewed as a projection apparatus region boundary address. Region in which projection apparatus region boundary have addresses X1~X5 in an upper layer are subdivided into regions x2, x5, x7, and x8 in a lower layer, thus having regions x1~x8.

In inheritance coordinates, it can be seen that the projection apparatus boundary address of a lower layer inherit the projection apparatus boundary address of an upper layer. For example, the address x3 of a lower layer is calculated as the address x3 of a lower layer to which the address X2 of the upper layer is added.

5. Verifying Decoding Errors

Figure 9:
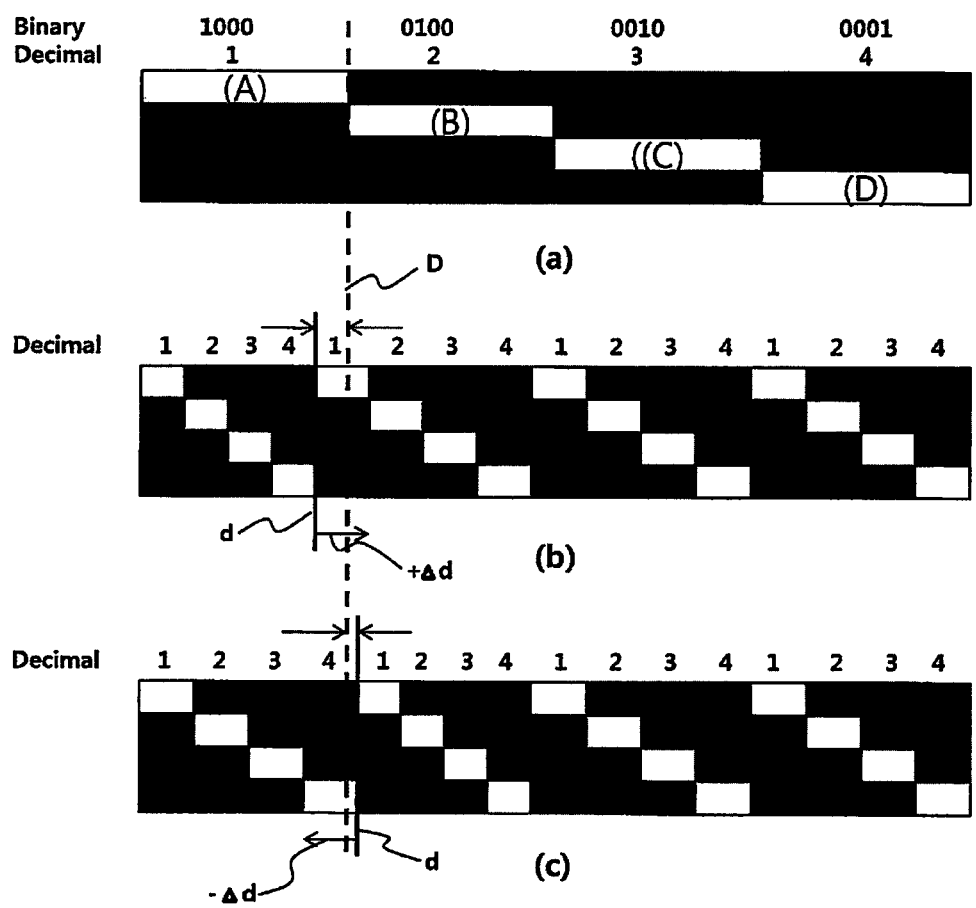
FIG. 9 is an explanatory block diagram showing the case where the boundaries of an upper layer and a lower layer obtained by an image reception apparatus are not identical with each other.

FIG. 9 is an explanatory block diagram showing an example in which the boundaries of an upper layer and a lower layer obtained by the image reception apparatus are not identical with each other. In FIG. 9, it is assumed that an HOC algorithm including four layers, each having four patterns, and including a total of 256 addresses is used. Furthermore, it is assumed that FIG. 9(a) shows a first layer and FIGS. 9(b) and 9(c) show second layers. FIG. 9(a) is a diagram illustrating a method of allocating addresses to an upper layer in the HOC algorithm, and FIGS. 9(b) and 9(c) are explanatory diagrams illustrating a method of allocating addresses to a lower layer in the HOC algorithm. In a conventional decoding algorithm for obtaining a 3-D image by applying the HOC algorithm, the boundaries of an upper layer and a lower layer are determined as boundaries according to precise timing. In FIG. 9, boundaries on each layer checked in time-series according to the conventional method are shown as a dotted line D, and boundaries on each layer detected by the image reception apparatus are shown as a solid line d.

In the example of FIG. 9, in an upper layer, '1000' as a binary address and '1' as a decimal address are allocated to a region A, '0100' as a binary address and '2' as a decimal address are allocated to a region B, '0010' as a binary address and '3' as a decimal address are allocated to a region C, and '0001' as a binary address and '4' as a decimal address are allocated to a region D.

In a lower layer, each of the regions of the upper layer is subdivided into four regions and assigned respective decimal addresses 1~4.

Theoretically, the boundaries of the upper layer and the lower layer must be precisely identical with each other. In boundaries obtained by the image reception apparatus, however, there is a problem in that the boundary of the upper layer and the boundary of the lower layer are not precisely identical with each other owing to a geometric shape of the surface of a target object or a feeling of texturing of the surface substantially. For example, in the case of FIG. 9, the boundary points of the regions A and B of the upper layer must be precisely identical with those of the lower layer. However, the boundary d detected as the corresponding boundary point of the lower layer in the image reception apparatus may be moved left as shown in FIG. 9(b), or the boundary d detected as the corresponding boundary point of the lower layer in the image reception apparatus may be moved right as shown in FIG. 9(c).

First, the number of errors occurring when decoding is processed according to the conventional decoding method if a boundary point is detected in a lower layer as in FIG. 9(b) is described. In order to describe the number of errors, in the example of FIG. 9, if one region belonging to a layer a (a value of 1 or higher to 4 or lower may be allocated to a) is encoded as an address b (a value from 1 to 4 may be allocated to b), the address of a region in each layer is calculated by Equation 1.

$$(b-1)s4^{(4-a)} \quad \text{[Equation 1]}$$

According to FIG. 9, the upper layer region A is encoded into a binary number 1000 (a decimal number 1). In accordance with the conventional decoding method, the region between the boundary point D made almost identical with the upper layer according to time-series timing and the boundary point d detected by the image reception apparatus is decoded so that the region belongs to the region A. A region placed between the regions d~D of the lower layer is included in a region that belongs to the decimal value 1 of the upper layer and in a region that belongs to the decimal value 1 of the lower layer, and thus the region is calculated as '0' as in Equation 2.

$$\text{Address of region placed between } d\sim D \text{ of lower layer} = \quad \text{(Equation 2)}$$
$$\text{Address of region } A \text{ of layer } 1 +$$
$$\text{Address of region between } d\sim D \text{ of layer } 2 =$$
$$(1-1)s4^{(4-1)} + (1-1)s4^{(4-1)} = 0$$

The address of the region actually placed between d~D must have a value close to about 64 actually. In accordance with the conventional decoding method, the region placed between d~D of the lower layer shows a large number of errors because it is detected as an address having 0 although it belongs to the upper layer A region (1 in a decimal number).

In contrast, a method of setting a boundary point according to a decoding method according to the present invention is described. After calculating a boundary point d detected by the image reception apparatus in a current layer and a virtual boundary point D according to time-series classification, whether a difference value d−D between the two boundaries falls within a range Δd or not is determined. If the difference value belongs to the range Δd, the boundary point d detected by the image reception apparatus and the virtual boundary point D according to time-series classification are detected as the same boundary, and the address of the current layer is calculated. For example, in the case of FIG. 9(b), a boundary point d detected by the image reception apparatus in a current layer and a virtual boundary D according to time-series classification are made identical with each other, the region between d~D corresponds to the decimal value 2 region of an upper layer in a decimal value and may be considered to correspond to a decimal value 1 in the current layer. Here, an address is calculated as in Equation 3.

$$\text{Address of region placed between } d\sim D \text{ of lower layer} = \quad \text{(Equation 3)}$$
$$(2-1)s4^{(4-1)} + (1-1)s4^{(4-2)} = 64$$

That is, in the present invention, since a calculation value 'd−D' is smaller than 0 in FIG. 9(b), an upper layer region belonging to the region d~D is interpreted to be included in regions subsequent to the time-series boundary D and the current layer region is applied without change.

In the above description, in the decoding method according to the present invention, the boundary point d detected by the image reception apparatus and the virtual boundary point D according to time-series classification have been illustrated as being used, but the calculation may be performed using the boundary point of an upper layer instead of the virtual boundary point D according to time-series classification.

Next, the case where the boundary point d detected as corresponding to the boundary of a lower layer in the image reception apparatus as shown in FIG. 9(c) is moved right is described below.

First, the number of errors occurring when decoding is processed according to the conventional decoding method if a boundary point is detected in a lower layer as in FIG. 9(c) is described.

According to FIG. 9, an upper layer region A is encoded into a binary number 1000 (a decimal number 1).

In accordance with the conventional decoding method, the region between the boundary point D made identical with the upper layer according to time-series timing and the boundary point d detected by the image reception apparatus is decoded as belonging to the region B. The region placed between d~D of the lower layer is a region corresponding to a decimal value 2 in the upper layer and is calculated as an address '112' as in Equation 4 because it belongs to a decimal value 4 of the lower layer.

$$\text{Address of region placed between} \quad \text{(Equation 4)}$$
$$d\sim D \text{ of lower layer} = (2-1)s4^{(4-1)} + (4-1)s4^{(4-2)} = 112$$

The address of the region actually placed between d~D must have a value close to about 48. In accordance with the conventional decoding method, the region placed between d~D of the lower layer shows a large number of errors because it is detected as an address having 112 although it belongs to the upper layer B region.

In contrast, in the present invention, after calculating a boundary point d detected by the image reception apparatus in a current layer and a virtual boundary point D according to time-series classification, whether a difference value d−D between the two boundaries falls within a range Δd or not is determined. If the difference value belongs to the range Δd, the boundary point d detected by the image reception apparatus and the virtual boundary point D according to time-series classification are detected as the same boundary, and the address of the current layer is calculated.

For example, in the case of FIG. 9(b), a boundary point d detected by the image reception apparatus in a current layer and a virtual boundary D according to time-series classification are made identical with each other, the region between d~D corresponds to the decimal value 1 region of an upper layer in a decimal value and may be considered to correspond to a decimal value 4 in the current layer.

$$\text{Address of region placed between } D\sim d \text{ of lower layer} = \quad \text{(Equation 5)}$$
$$(1-1)s4^{(4-1)} + (4-1)s4^{(4-2)} = 48$$

That is, in the present invention, since a calculation value 'd−D' is 0 or higher in FIG. 9(c), an upper layer region belonging to the region d~D is interpreted to be included in regions prior to the time-series boundary D and the current layer region is applied without change.

In the above description, in the decoding method according to the present invention, the boundary point d detected by the image reception apparatus and the virtual boundary point D according to time-series classification have been illustrated as being used, but the calculation may be performed using the boundary point of an upper layer instead of the virtual boundary point D according to time-series classification.

In the above examples, the value Δd is typically determined according to an experimental value, but it is preferred that the value Δd have a value smaller than ½ of a range value that classifies a region within a current layer (lower layer). The value Δd must be determined at least within a range that does not go out of the range value that classifies the region. For example, in the case of FIG. 9, since a range value that classifies a region in a second layer is 16, it is preferred that the range value Δd be smaller than 8. Although the value Δd is set to a maximum value, it must be smaller than at least 16.

6. Results of Experiments

3-D depth measurement was performed by repeating a method of radiating light to a chessboard in the state in which the distance from a camera (the image reception apparatus) maintains about 80 cm and correcting boundary lines according to the present invention and a conventional method sing time-series boundary lines 30 times. In 3-D restoration, the least squares fitting technique was applied, and the mean value and a variance value for the mean distance between 3-D points for a fitted plane and the average number of restored 3-D points are shown in Table 1.

TABLE 1

|  | Mean (mm) | Variance (mm$^2$) | Number of 3-D points |
|---|---|---|---|
| Present Invention | 0.12232 | 0.016658 | 11340 |
| Prior Art | 0.90051 | 56.4900 | 11338 |

As shown in Table 1, it can be seen that the case of the present invention has a lower variance value than the conventional technique, thus leading to precise results.

the fitted plane. The calibration block was placed about 1 m from the projector-camera system. We conducted two experiments:

First experiment: a face of the calibration block was parallel to the projector-camera plane.

As can be seen in Table 2, with approximately the same number of points, the accuracy of Ray-Tracing codecs are significantly improved compared with original HOC and GCI.

TABLE 2

Errors of Reconstructed 3D Data of the checkerboard surface orthogonal to the camera Using Ray-Tracing codecs based on HOC and GCI, HOC and GCI.

|  | Standard deviation of error (mm) | Error max (mm) | Number of points |
|---|---|---|---|
| Ray-Tracing codec based on HOC | 0.184 | 2.082 | 17,810 |
| Ray-Tracing codec based on GCI | 0.193 | 2.507 | 16,961 |
| HOC | 1.007 | 10.336 | 17,069 |
| GCI | 0.412 | 3.601 | 17,810 |

Second experiment: the faces of the calibration block were slanted about 45 degree to the projector-camera plane. The results are shown in Table 3, since the faces are slanted, the projected patterns are shrunk/expanded thus the errors are increased/decreased depending on the angle of the surface to camera and projector. As we can see in the Table 3, the errors of the 3D data on left plane are decreased, whereas on right plane are increased. However, the accuracy of Ray-Tracing codecs are still better than the original methods.

TABLE 3

Errors of Reconstructed 3D Data of the checkerboard surface slanted 45 degree to the camera Using Ray-Tracing codecs based on HOC and GCI, HOC and GCI.

|  | Left Plane | | | Right Plane | | |
|---|---|---|---|---|---|---|
|  | Standard deviation of error (mm) | Error max (mm) | Number of points | Standard deviation of error (mm) | Error max (mm) | Number of points |
| Ray-Tracing codec based on HOC | 0.213 | 4.991 | 17,661 | 0.210 | 2.172 | 9,100 |
| Ray-Tracing codec based on GCI | 0.287 | 0.938 | 18,096 | 0.282 | 2.307 | 8,617 |
| HOC | 5.907 | 259,620 | 15,707 | 2,722 | 27,890 | 8,028 |
| GCI | 1.008 | 14.519 | 18,096 | 0.427 | 2.371 | 9,126 |

3. B.2. Quantitative Evaluation

To evaluate the accuracy as well as the effect of variation in surface reflection on the proposed Ray-Tracing codecs based on HOC and GCI, HOC and GCI, we captured the 3D data of a face of calibration block made from aluminum (FIG. 16), which has the flatness-values as: standard deviation is 0.260365 μm and max error is 1.149865 μm, by these methods and we measured the errors in the captured data. The error was defined as the distance from the reconstructed points to While the invention has been shown and described with respect to the preferred embodiments, it will be understood by those skilled in the art that various changes and modifications may be made without departing from the spirit and scope of the invention as defined in the following claims.

What is claimed is:

1. A method of decoding hierarchically orthogonal structured light, the method for obtaining a 3-D image by encoding layers of the structured light to carry hierarchically orthogonal address information, radiating the encoded layers of light to a target object by a projector, and decoding an image of structured light layers captured by an imaging processor to obtain relevant address information using an operation processor, the method comprising:

identifying, at the operation processor, boundary lines from different layers of the structured light that represent same boundaries as boundaries encoded at identical positions on the projector; and converting, at the operation processor, the identified boundary lines into identical boundary positions to correct detected boundary lines being determined as noise.

2. The method of claim 1, wherein the identifying boundary lines comprises correcting the boundary lines by taking different reflectivities of surfaces of the target object into consideration in order to precisely measure positions of the boundary lines.

3. The method of claim 2, wherein the correcting the boundary lines by taking different reflectivities of surfaces of the target object into consideration uses $$f_s(x) = ((s(x) \otimes g_p(x, \sigma_p))R(x) + A(x)) \otimes g_c(x, \sigma_c) + W(x)$$

$$f_c(x) \approx \frac{deconvlucy((f_c(x) - f_0(x)), \sigma_c)}{deconvlucy((f_1(x) - f_0(x)), \sigma_c)}(H - L)$$

(wherein fs(x) is a captured light stripe signal in a camera image, s(x) is a pattern for projector illumination, R(x) is a reflection index of the local surface at x, fc(x) is a canonical form of light pattern, A(x) is ambient light, $g_p(x,\sigma_p)$ is a Gaussian blur kernel of a projector lens at x position with blur radius $\sigma_p$, $g_c(x,\sigma_c)$ is Gaussian blur kernel of camera lens at x position with blur radius $\sigma_c$, W(x) is noise of an imaging sensor, $f_o(x)$ is a captured image when black pattern is projected, $f_1(x)$ is a captured image when white pattern is projected, H is a maximum intensity of pattern image (here we used 255), and L is the minimum intensity of pattern image (here we used 0)).

4. The method of claim 1, wherein the converting the detected boundary lines into identical boundary lines comprises:

obtaining a detected boundary point d from which an image is checked in a current layer;

obtaining a time-series boundary point D detected in time series;

calculating a difference value d–D between the time-series boundary point D and the detected boundary point d; and changing the detected boundary point d into an identical boundary with the time-series boundary point D when the difference value calculated in the third step falls within a range Δd and setting the detected boundary point d as a new boundary point when the difference value calculated in the third step does not fall within the range Δd, wherein the obtaining a detected boundary point d and the obtaining a time-series boundary point D are performed irrespective of order.

5. The method of claim 4, wherein the converting the detected boundary lines into identical boundary lines comprises setting a region between d and D in the current layer so that the region between d and D in the current layer may be included in a region next to a time-series boundary point D of the upper layer or the upper layer boundary point D, when the difference value d–D has a value smaller than zero.

6. The method of claim 4, wherein the converting the detected boundary lines into identical boundary lines comprises setting a region between d and D in the current layer so that the region between d and D in the current layer may be included in a region anterior to a time-series boundary point D of the upper layer or the upper layer boundary point D, when the difference value d–D calculated has a value greater than zero.

7. The method of claim 4, wherein the Δd is set to be smaller than a range value which classifies a region within the current layer.

8. The method of claim 7, wherein the Δd is set to be smaller than ½ of a range value which classifies a region within the current layer.

9. The method of claim 1, wherein the converting the detected boundary lines into identical boundary lines comprises:

obtaining an upper layer boundary point D detected in an upper layer;

obtaining a detected boundary point d from which an image is checked in a current layer;

calculating a difference value d–D between the detected boundary point d and the upper layer boundary point D; and changing the detected boundary point d into an identical boundary with the upper layer boundary point D when the difference value d–D falls within a range Δd and setting the detected boundary point d as a new boundary point when the difference value calculated in the third step does not fall within the range Δd.

10. A 3-D depth measurement system, comprising a projection apparatus for encoding structured layers of light including hierarchically orthogonal addresses and for radiating the encoded structured layers of light to a target object, an image reception apparatus for receiving the layers of light radiated to the target object, and an operation processing apparatus for decoding an image of structured light layers captured by an imaging processor to obtain relevant address information and for calculating and processing a 3-D depth of the target object, wherein the operation processing apparatus identifies boundary lines from different layers of the structured light that present same boundaries as boundaries encoded at identical positions on the protection apparatus, and performs a boundary line inheritance process of converting the identified boundary lines into identical boundary positions to correct detected boundary lines being determined as noise.

11. The 3-D depth measurement system of claim 10, wherein the boundary line inheritance process comprises obtaining a detected boundary point d from which an image is checked in a current layer, obtaining a time-series boundary point D detected in time series, calculating a difference value d–D between the time-series boundary point D and the detected boundary point d, and changing the detected boundary point d into an identical boundary with the time-series boundary point D when the difference value falls within a range Δd and setting the detected boundary point d as a new boundary point when the difference value does not fall within the range Δd.

12. The 3-D depth measurement system of claim 11, wherein the operation processing apparatus sets a region whose address is to be obtained in the current layer so that the region whose address is to be obtained in the current layer may be included in a region next to a time-series boundary point D of the upper layer, when the calculated difference value d–D has a value smaller than zero.

13. The 3-D depth measurement system of claim 11, wherein the operation processing apparatus sets a region whose address is to be obtained in the current layer so that the region whose address is to be obtained in the current layer may be included in a region anterior to a time-series boundary point D of the upper layer or the upper layer boundary point D, when the calculated difference value d−D has a value equal to or greater than zero.

14. The 3-D depth measurement system of claim 11, wherein the $\Delta d$ is set to be smaller than a range value which classifies a region within the current layer.

15. The 3-D depth measurement system of claim 14, wherein the $\Delta d$ is set to be smaller than ½ of a range value which classifies a region within the current layer.

16. The 3-D depth measurement system of claim 10, wherein the boundary inheritance process comprises obtaining an upper layer boundary point D detected in an upper layer, obtaining a detected boundary point d from which an image is checked in a current layer, calculating a difference value d−D between the detected boundary point d and the upper layer boundary point D, and changing the detected boundary point d into an identical boundary with the upper layer boundary point D when the difference value falls within a range $\Delta d$ and setting the detected boundary point d as a new boundary point when the difference value does not fall within the range $\Delta d$.

17. A method of obtaining a 3-D image of a target object, comprising:
   decoding a radiated hierarchically orthogonal structured image including hierarchically orthogonal address information by capturing an image of the target object to which encoded structured light is radiated using an operation processor;
   detecting boundary lines in the radiated image and the captured image, which are encoded at an identical position between layers; and
   converting the boundary lines into identical boundary lines in response to the detected boundary lines being determined as noise.

* * * * *